United States Patent [19]

Cetnar

[11] Patent Number: 5,531,489
[45] Date of Patent: Jul. 2, 1996

[54] ANTI-KINK CABLE FOR AUTOMOTIVE DOOR HANDLES

[75] Inventor: Roman Cetnar, Newmarket, Canada

[73] Assignee: Atoma International Inc., Markham, Canada

[21] Appl. No.: 309,500

[22] Filed: Sep. 23, 1994

[51] Int. Cl.⁶ .............................. F16L 21/02; F16C 1/10
[52] U.S. Cl. ................... 292/225; 292/DIG. 25; 74/502.4; 74/502.6
[58] Field of Search ............... 74/502.4, 502.5, 74/502.6; 292/225, 235, DIG. 23, DIG. 25, DIG. 43, 336.3

[56] References Cited

U.S. PATENT DOCUMENTS

| | | | |
|---|---|---|---|
| 2,492,683 | 12/1949 | Claud-Mantle | 292/225 |
| 2,961,265 | 11/1960 | Jakeman | 292/DIG. 23 |
| 3,013,443 | 12/1961 | Morse | 74/502.4 |
| 3,846,033 | 11/1974 | Smollinger | 74/502.6 |
| 4,474,393 | 10/1984 | Kimura | 292/DIG. 25 |
| 4,987,968 | 1/1991 | Martus | 74/502.4 |
| 5,003,838 | 4/1991 | Pospisil | 74/502.4 |
| 5,035,452 | 5/1991 | Rogers . | |
| 5,222,413 | 6/1993 | Gallas | 74/502.4 |
| 5,277,461 | 1/1994 | Dzurko | 292/336.3 |

FOREIGN PATENT DOCUMENTS

| | | | |
|---|---|---|---|
| 44699 | 1/1982 | European Pat. Off. | 74/502.4 |
| 2644532 | 9/1990 | France | 74/502.4 |
| 3923726 | 1/1991 | Germany | 292/DIG. 23 |
| 1409528 | 10/1975 | United Kingdom | 74/502.4 |

*Primary Examiner*—Steven N. Meyers
*Assistant Examiner*—Gary Estremsky
*Attorney, Agent, or Firm*—Cushman, Darby & Cushman

[57] ABSTRACT

A vehicle door latch assembly comprises a latching mechanism carried by a vehicle door structure, a manually operable releasing assembly mounted on the door frame, a flexible cable, and a cable controlling assembly. The latching mechanism includes a movable releasing component and a latch, and is movable between an unlatched and latched relation with the door opening catch. The manually operable releasing assembly is mounted for resiliently biased movement into an inoperative position, the releasing assembly having a manually engageable component disposed outwardly of the interior panel. The manually engageable component can be manually engaged and moved to move the releasing assembly against the resilient bias thereof from the inoperative position thereof into an operative position so that upon manual release of the manually engageable component the resilient bias will return the releasing assembly into the inoperative position thereof. The flexible cable has one end connected with the manually operable releasing assembly and a spaced portion connected with the movable releasing component so as to transmit the movement of the manually operable releasing assembly into movement of the releasing component. The cable-controlling assembly is operatively associated with an end portion of the flexible cable and has a length at least as great as the extent of movement of the one end when the moving component is moved between the inoperative and releasing positions. The cable-controlling assembly is in surrounding relation to the cable end portion to prevent the buckling of the flexible cable portion under compression during the resiliently biased return of the releasing assembly.

8 Claims, 7 Drawing Sheets

5,531,489

ANTI-KINK CABLE FOR AUTOMOTIVE DOOR HANDLES

This invention generally relates to motor vehicles, and more particularly, to a vehicle door and latching assembly therefor.

BACKGROUND OF THE INVENTION

In the prior art, it is known to provide a Bowden cable system for unlatching a vehicle door from within the vehicle. Typically, the cable system includes a flexible cable with one end thereof connected with a spring biased manually operable releasing assembly and is tensioned in response to outward movement of a manually engageable portion or door handle of the manually operable releasing assembly extending outwardly of the interior door panel. Another end of the cable is connected with a door latching mechanism carried by the door to latch and unlatch the door structure with a door opening catch. Manually moving the door handle against the spring bias of the releasing assembly translates into movement of the latching mechanism through tensioning of the cable into unlatched relation with the door opening catch. Subsequent release of the interior door handle causes a spring-biased return of the releasing assembly to its normal inoperative position and, through compression of the flexible cable, movement of the latching mechanism into a position or condition wherein it can re-latch with the door opening catch when the door is closed.

Typically, the cable extends through a flexible sheath that protects and guides the cable during tensioning or compression thereof. Each end of the flexible sheath terminates in a rigid tubular bushing fixed thereto, with the tubular bushing at the releasing assembly end being secured to a handle support, which is in turn secured to the vehicle door.

A problem associated with such assemblies is caused by the repeated periodic tensioning and compression of the flexible cable. More specifically, when the cable is tensioned by moving the interior door handle against the spring-bias of the releasing assembly and is then suddenly compressed by release of the handle, the cable may kink or buckle at a position between the portion at which it is connected with the handle and the rigid cable bushing. The problem may be exacerbated in the winter, when ice may accumulate between the cable and the bushing or sheath. That is, when the cable is tensioned, ice may be drawn into the sheath/bushing at the latching mechanism end of the cable and thereby lock that end of the cable in place. When the handle is subsequently released, the spring biased force of the releasing assembly moves an inner portion of the handle, to which the cable is fixed, towards the rigid tubular bushing and may cause buckling of the cable between the inner portion of the handle and the bushing. Such kinking or buckling of the cable may result in permanent crimping and damage to the cable.

Therefore, it is an object of the present invention to alleviate the problem described above in an efficient and cost effective manner. This object is accomplished by providing a vehicle door latch assembly for latching and unlatching a door structure including a frame supporting an exterior skin and interior panel with respect to a vehicle door opening catch. The door latch assembly includes a latching mechanism carried by the door structure constructed and arranged to move between an unlatched relation with the door opening catch and a latched relation with the door opening catch, the latching mechanism including a movable releasing component and a latch, the movable releasing component being movable between a first and second position, the latch being constructed and arranged i) to be in a latching position when the latching mechanism is in latched relation with the door opening catch, and ii) to be moved from the latching position into a releasing position in response to movement of the movable releasing component from the first position to the second position so that the latching mechanism is moved into unlatched relation with the door opening catch, a manually operable releasing assembly mounted on the door frame for resiliently biased movement into an inoperative position, the releasing assembly having a manually engageable component disposed outwardly of the interior panel, the manually engageable component constructed and arranged to be manually engaged and moved to move the releasing assembly against the resilient bias thereof from the inoperative position thereof into an operative position so that upon manual release of the manually engageable component the resilient bias will return the releasing assembly into the inoperative position thereof, a flexible cable having one end connected with the manually operable releasing assembly and a spaced portion connected with the movable releasing component so as to transmit (1) the movement of the manually operable releasing assembly from its inoperative position into its operative position through tension in the flexible cable into movement of the releasing component from its first position to its second position so that the latch, when in its latching position, is moved into its releasing position, and (2) the movement of the manually operable releasing assembly from its operative position to its inoperative position through compression in the flexible cable into movement of the releasing component from its second position to its first position, and a cable-controlling assembly operatively associated with an end portion of the flexible cable adjacent the one end having a length at least as great as the extent of movement of the one end when the moving component is moved between the inoperative and releasing positions, the cable-controlling assembly being constructed and arranged in surrounding relation to the cable end portion to prevent the buckling of the flexible cable portion under compression during the resiliently biased return of the releasing assembly.

Other objects and advantages of the invention will be apparent from the following description, the accompanying drawings, and the appended claims.

BRIEF DESCRIPTION OF THE DRAWINGS

FIG. 6b is a front view showing the door opening catch of FIG. 6a;

DETAILED DESCRIPTION OF THE DRAWINGS

Figure 1:
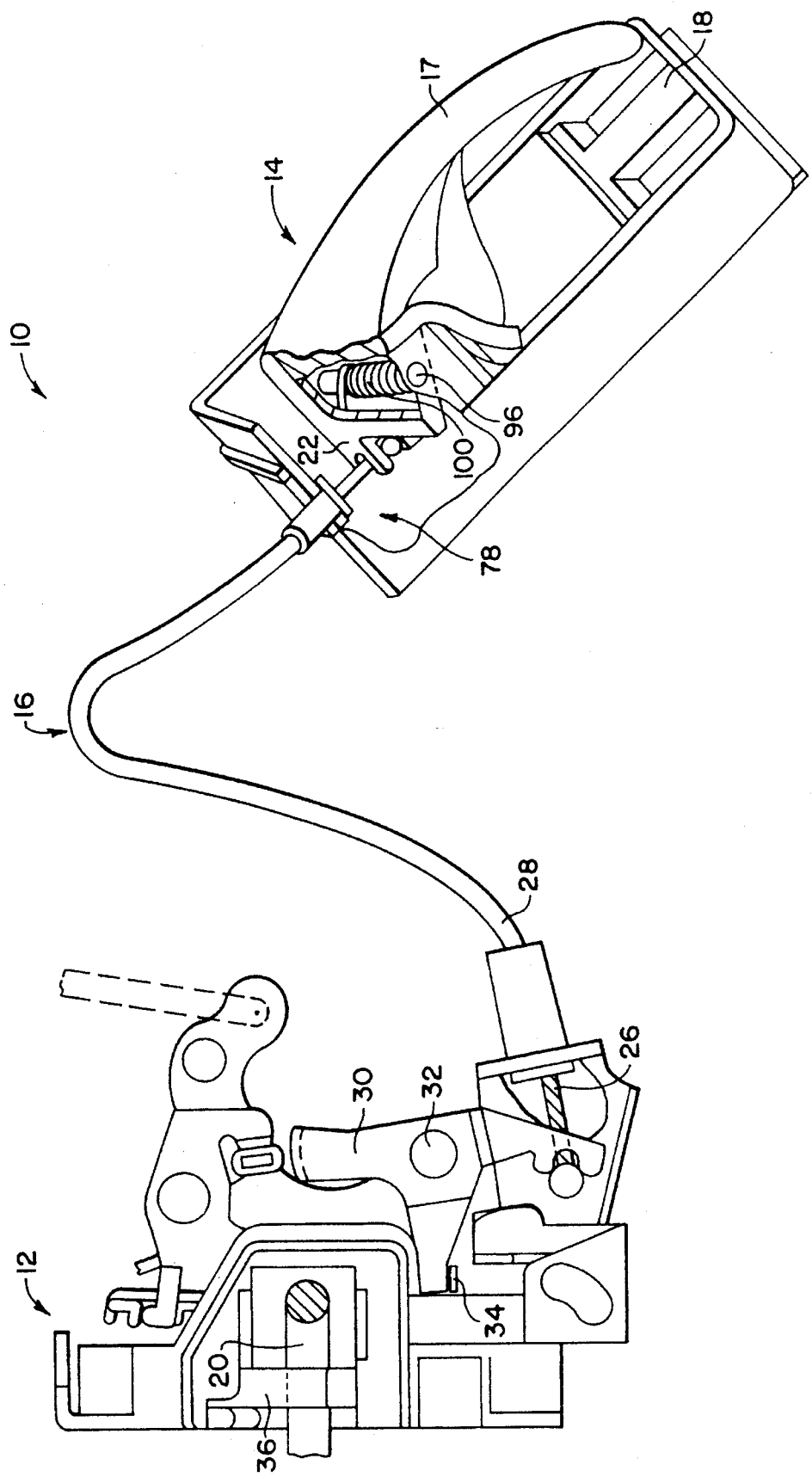
FIG. 1 is a perspective view, partly in section, showing the door latching assembly of the present invention in latched relation with a door opening catch.

In FIG. 1, there is shown generally the door latching assembly 10 of the present invention. The door latching assembly includes a latching mechanism shown generally at 12, and a manually operable releasing assembly shown generally at 14. A flexible cable assembly 16 operably connects the latching mechanism 12 with the manually operable releasing assembly 14. The cable assembly 16 includes a flexible cable 26 and exterior flexible sheath 28 through which the cable extends. The manually operable releasing assembly 14 includes a manually engageable component 17, pivotally mounted on a handle support 18 to be fixed to a conventional door structure.

Figure 2:
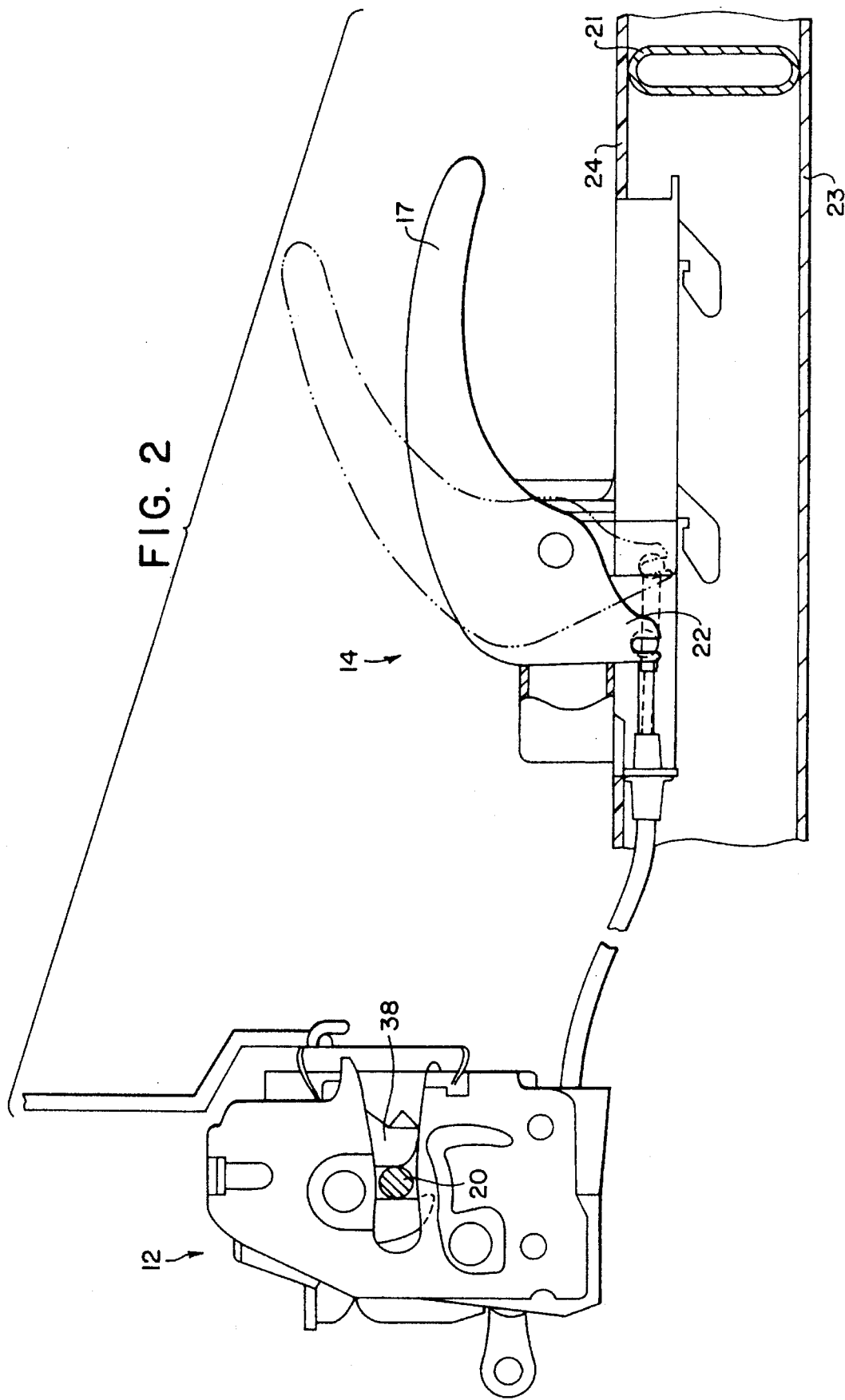
FIG. 2 is a perspective view showing the door latching mechanism of the present invention in latched relation with a door opening catch and showing the range of movement of the releasing assembly of the present invention.

As shown in FIG. 2, the door structure includes a frame 21 supporting an exterior skin 23 and interior door panel 24. The manually engageable component 17 is disposed outwardly of the interior panel and can be manually engaged and moved to unlatch the latching mechanism 12 with respect to a door opening catch 20.

FIGS. 1 and 2 taken together show that manually engageable component 17 has an inner portion 22 thereof disposed between the exterior skin 23 and interior panel 24. Inner portion 22 is connected with one end of cable 26, and when manually engageable component 17 is manually pulled into the position indicated by the dashed lines in FIG. 2, the cable 26 is tensioned and pulled through exterior sheath 28 towards the releasing assembly 14.

The manually operable releasing assembly is spring biased so that when manually engageable component 17 is released, it resiliently returns to its original position. Return movement of the manually engageable component 17 in this manner compresses flexible cable 26 back to its original position through sheath 28.

Figure 3:
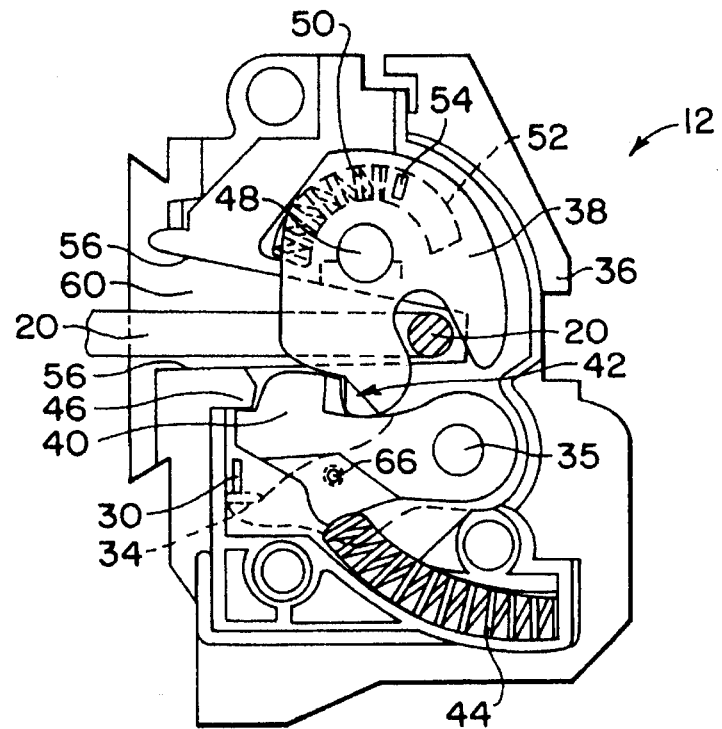
FIG. 3 is a front plan view showing the latching mechanism of the present invention in latched relation with the door opening catch and with certain parts removed to better reveal others.

In FIG. 3, certain portions of the latching mechanism 12 are removed to better reveal others. As shown, the latching mechanism includes a housing or main body 36, a latch 38, and a movable releasing component 40. The latching mechanism is shown in latched relation with respect to the door opening catch 20. The movable releasing component 40 is connected with an inner movable portion 34 thereof (shown in dashed lines) disposed on an opposite side of body 36 through a stem portion 66. An arcuate slot in body 36 provides a track for stem portion 66 to enable movable portion 34 and releasing component 40 to be pivotable together about the same pivot 35. Releasing component 40 is resiliently biased into the position shown by a coil spring 44 received in an arcuate channel in body 36. The biased position of component 40 is limited by an engaging portion 46 of main body 36 and/or the interface with latch 38, generally indicated at 42.

A second end of the flexible cable 26 is operatively connected with latching mechanism 12 in such a manner that the aforementioned tensioning of the cable effectuates counterclockwise pivotal movement of a pivotal member 30 about pivot 32 as shown in FIG. 1. Referring back to FIG. 3, it can be seen that pivotal movement of member 30 causes it to be forced against the movable portion 34. This in turn causes pivotal movement of movable releasing component 40 against the resilient force of spring 44 to disengage latch 38 at interface 42 and enable the latch 38 to release the door opening catch 20. More specifically, latch 38 is spring-biased in a clockwise direction about pivot 48 as shown in FIG. 3 by action of a coil spring 50. The coil spring 50 is received in an arcuate groove 52 in main body 36. A stem portion 54 of latch 38 extends into the arcuate groove 52 to make contact with coil spring 50.

Figure 4:
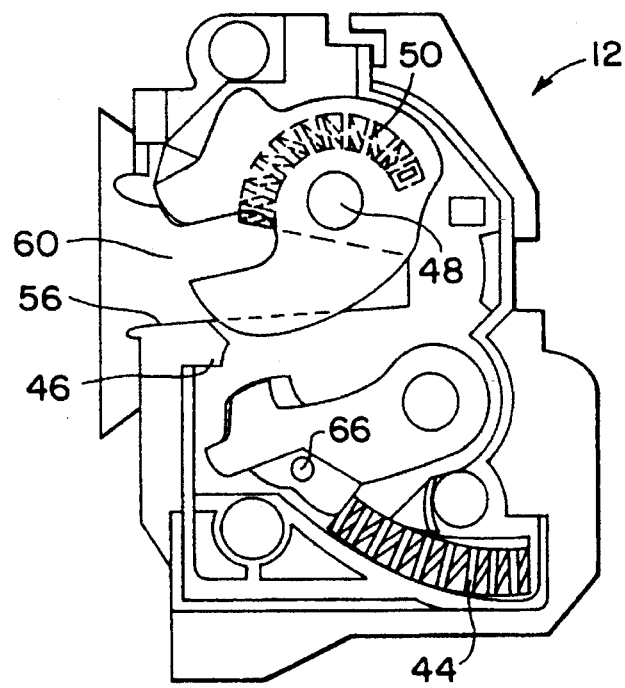
FIG. 4 is a front plan view showing the latching mechanism of the present invention in unlatched relation with the door opening catch and with certain parts removed to better reveal others.
Figure 5:
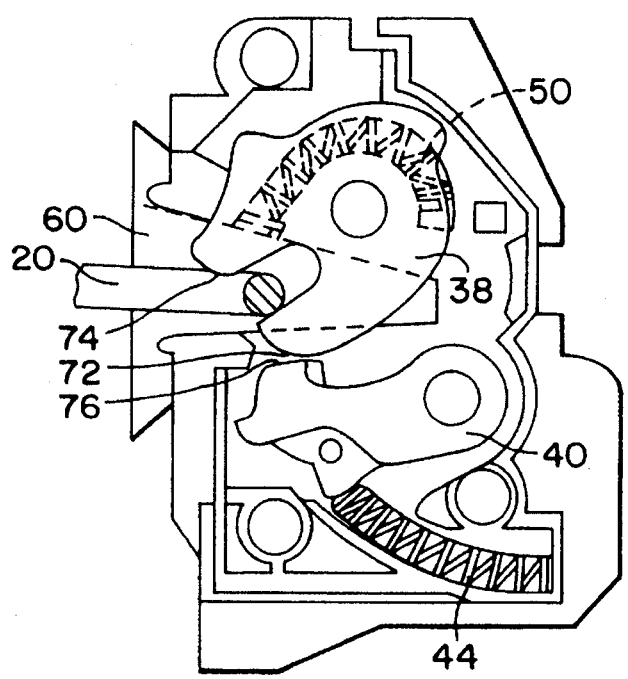
FIG. 5 is a view similar to that in FIG. 4 but showing the latching mechanism of the present invention in transit from its unlatched relation into its latched relation with the door opening catch.

As shown, body 36 has walls 56 defining a slot 60. The door opening catch 20 is shown held within slot 60 by latch 38 in FIG. 3. The clockwise rotation of latch 38 operates to release the door opening catch 20 through slot 60 as can be appreciated from FIG. 4. It can also be appreciated that when manually engageable component 17 is released, flexible cable 26 is compressed and movable releasable component 40 is permitted to return to its original position against engaging portion 46 through the force of coil spring 44. Latch 38 will remain in its position shown in FIG. 4 until the vehicle door is closed so that, as shown in FIG. 5, door catch 20 is received in slot 60 and is forced against the latch to rotate the latch in a counterclockwise direction against the biasing force of spring 50 to its initial latching position. In its return to the latching position, arcuate surfaces 72 and 74 of latch 38 sequentially abut against surface 76 of the movable releasing component 40 to momentarily slightly compress coil spring 44 in allowing catch 38 to return to its latching position.

Figure 6A:
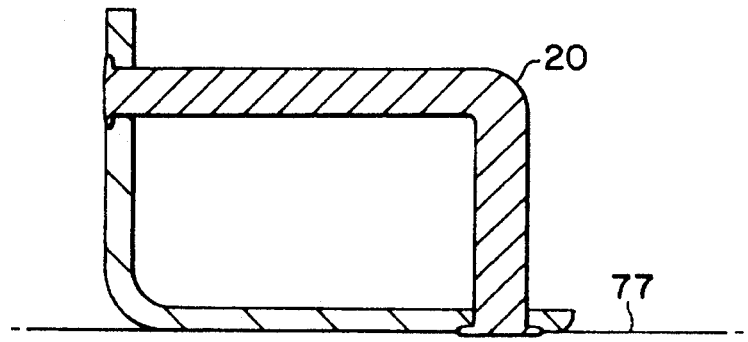
FIG. 6a is a side sectional view showing the door opening catch of the present invention.
Figure 6B:
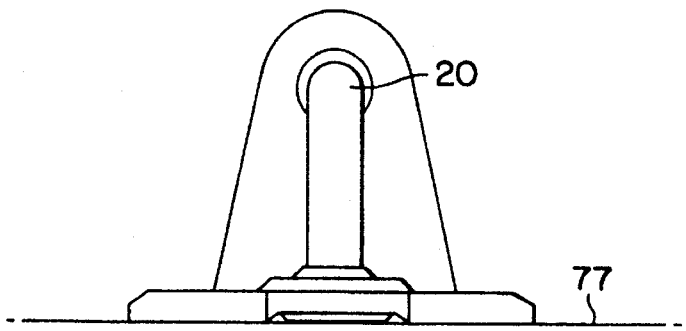

Shown generally in FIGS. 6a and 6b are a side sectional view and front view, respectively, of the door opening catch 20. The catch 20 is fixed by appropriate fasteners to surface 77 defining part of a door opening in the vehicle.

Figure 7:
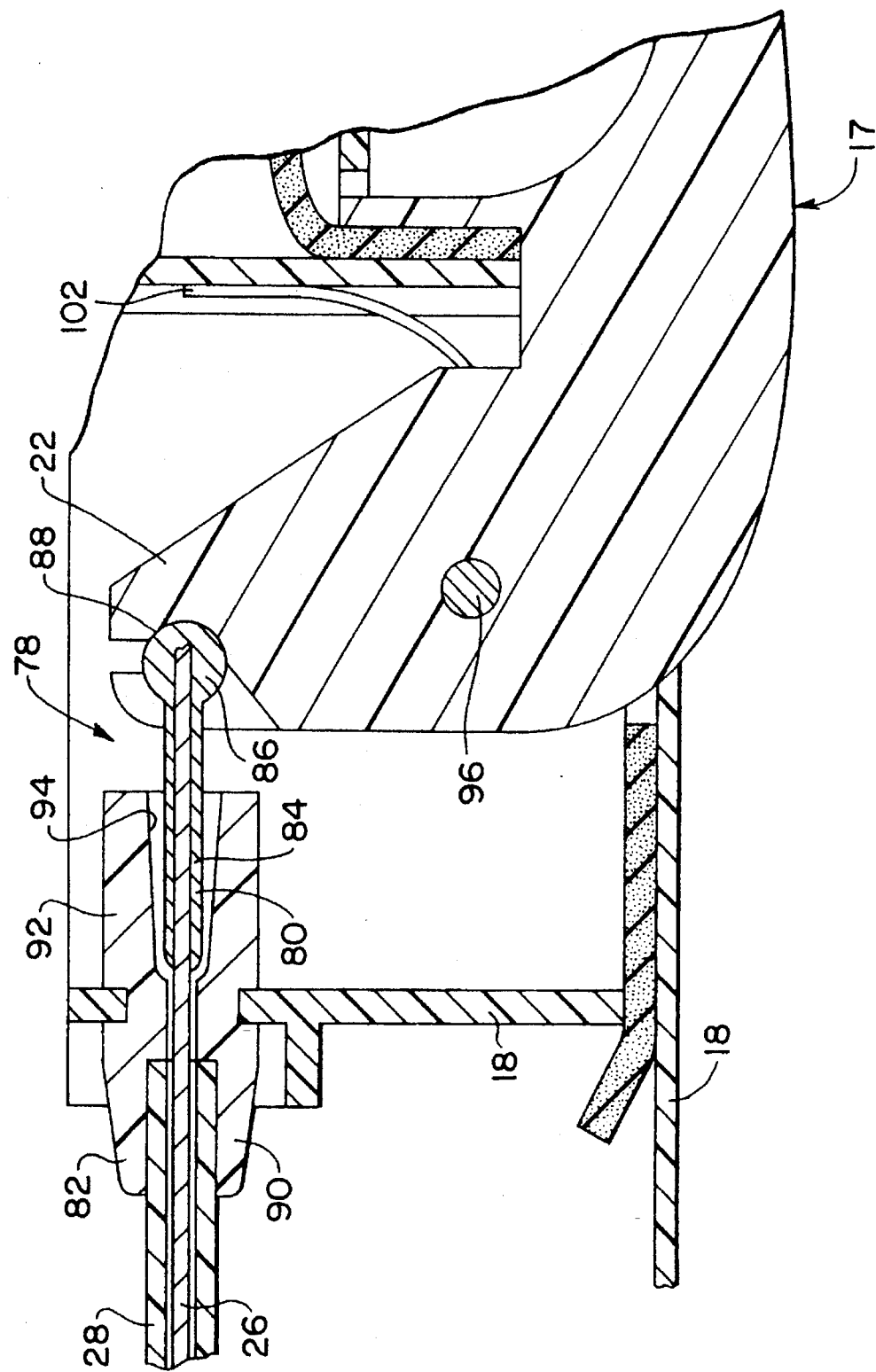
FIG. 7 is a partial side sectional view showing the manually operable releasing assembly of the present invention in its inoperative position.

FIG. 7 shows the connection between the inner portion 22 of manually engageable component 17 with a cable controlling assembly generally indicated at 78. The cable controlling assembly includes a cable ferrule 80 and a especially adapted tubular cable bushing 82.

The ferrule 80 is preferably a rigid metallic structure having an elongate portion 84 fixed in surrounding relation to an end portion of cable 26 and terminates in a generally spherical portion 86. The ferrule 80 is fixed to the end of cable 26 by welding, soldering, crimping or the like and makes the end portion of the cable substantially inflexible to prevent kinking or buckling of the cable. The spherical portion 86 of the ferrule is received in a socket 88 within the inner portion 22 of the manually engageable component, the spherical portion and socket cooperating to permit pivotal movement of the elongate portion 84 about the spherical portion 86.

Figure 8:
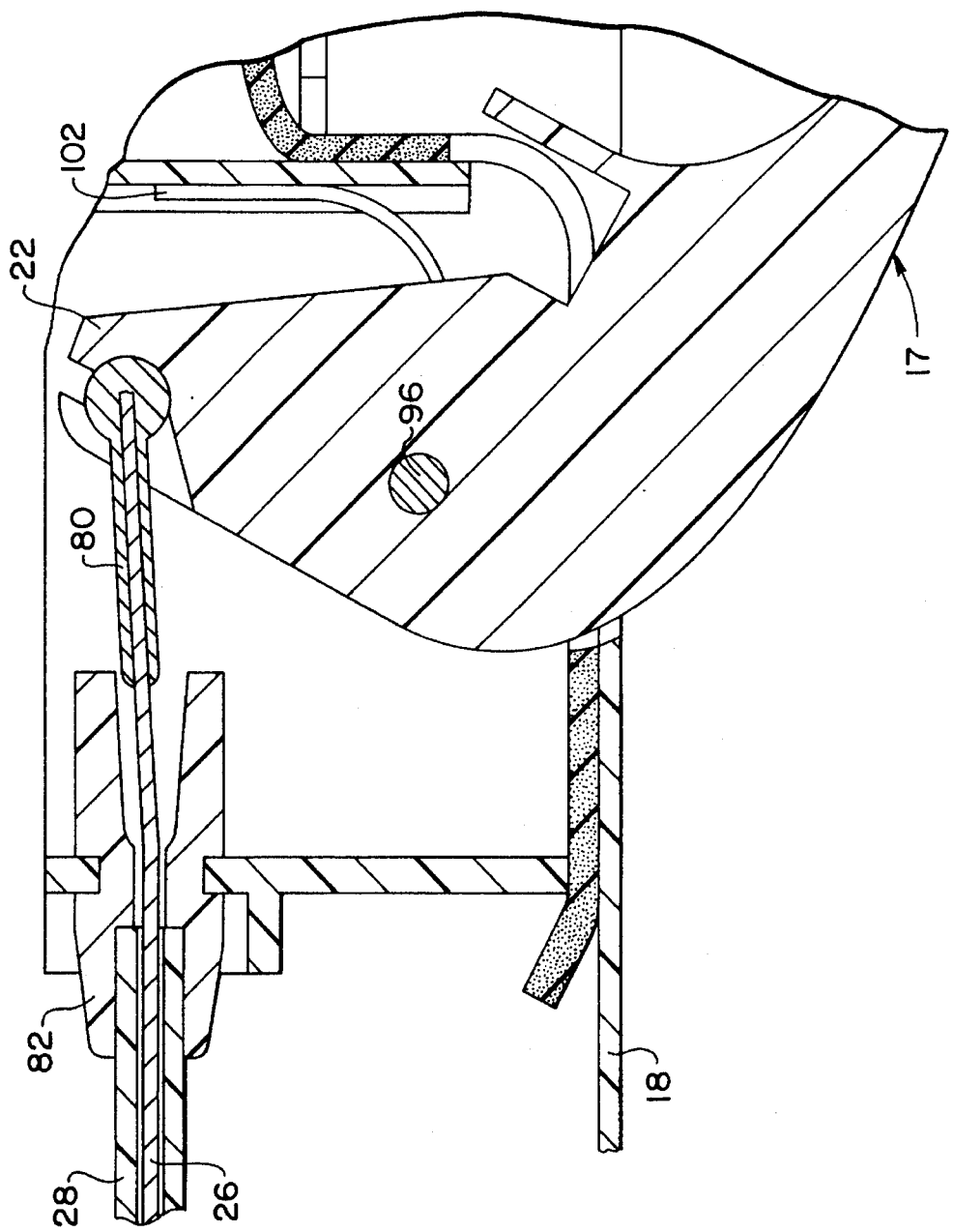
FIG. 8 is a view similar to that in FIG. 7, but showing the manually operable releasing assembly in its operative position.

Tubular bushing 82 is preferably a rigid plastic structure fixed to the door handle support 18. The bushing receives flexible cable 26 therethrough. A first end 90 of tubular bushing 82 receives an end of the flexible sheath 28 in fixed relation. A second sleeve-like end 92 has an opening adapted to receive elongate portion 84 of the ferrule. As shown, the inner surface 94 of second end 92 slightly diverges away from a central axis extending through the bushing 82 as the inner surface 94 approaches the opening. This accommodates slight bending of flexible cable 26 as it is tensioned and pulled through bushing 82 by pivotal movement of engageable component 17 about pivot 96 as shown in FIG. 8. It can be appreciated that to effectuate its proper function, the ferrule 80 should have a length at least as great as the extent of movement of the end of the cable.

Figure 9:
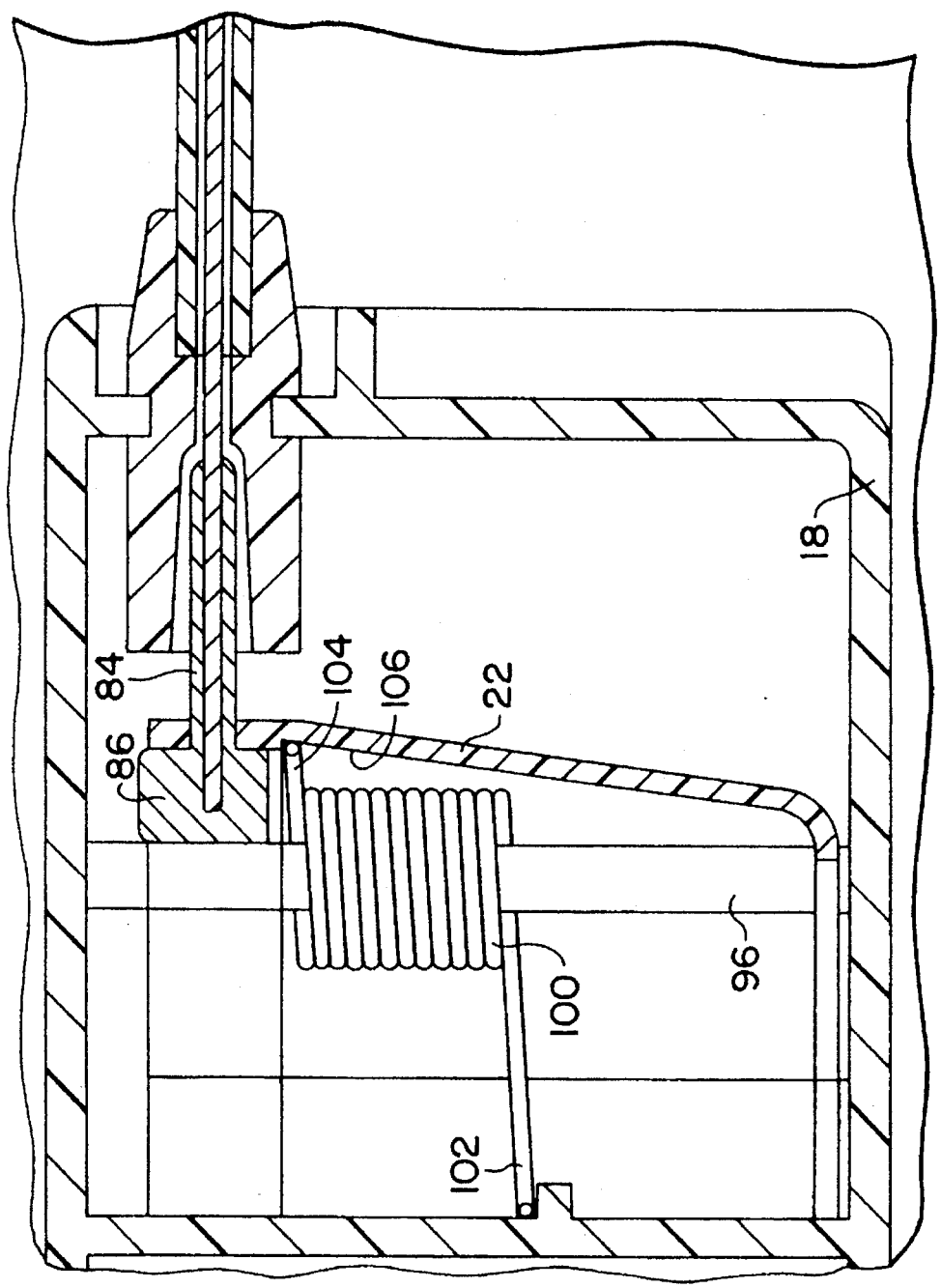
FIG. 9 is a sectional bottom view showing portions of the manually operable releasing assembly, including a biasing coil spring.

As shown in FIGS. 1 and 9, the manually operable releasing assembly includes a tensioning spring 100 disposed within handle support 18. Pivot 96 comprises a bolt member or the like, which extends through the coils of spring 100.

It can be appreciated that spring 100 resiliently biases the manually engageable component 17 into the position shown by the solid line drawing in FIG. 1, so that manually operable releasing assembly 14 is resiliently biased into its inoperative position. Referring back to FIG. 9, spring 100 is provided with a first end 102 which rests against handle support 18, and a second end 104 which rests against an inner surface 106 of an inner portion 22 of the manually engageable component. As the manually engageable component is moved to the position shown by the dashed line drawing in FIG. 1, the end 104 of coil spring 100 is moved in the coiling direction, thereby tensioning the coil spring.

The force of coil spring 100 returns the inner portion 22 of the manually engageable component from its position in FIG. 8 to its position in FIG. 7. It is during this return movement that the associated problems with buckling of flexible cable 26 between the manually engageable component and the bushing 82 might otherwise occur but for the advantages provided by the present invention. As can be appreciated, the rigidity of ferrule 80 prevents such buckling from occurring. It is apparent, therefore, that in the broadest aspects of the invention, the cable controlling assembly only includes the ferrule 80, without the especially adapted tubular bushing 82 for receiving the ferrule.

It thus will be appreciated that the objects of this invention have been fully and effectively accomplished. It will be realized, however, that the foregoing preferred specific embodiment has been shown and described for the purpose of this invention, and is subject to change without departure from such principles. Therefore, this invention includes all modifications encompassed within the spirit and scope of the following claims.

What is claimed is:

1. A vehicle door latch assembly for latching and unlatching a door structure including a frame supporting an exterior skin and interior panel with respect to a vehicle door opening catch, said door latch assembly including:

a latching mechanism constructed and arranged to be able to be carried by said door structure and to move between an unlatched relation with the door opening catch and a latched relation with the door opening catch;

said latching mechanism including a movable releasing component and a latch, said movable releasing component being movable between a first and a second position, said latch being constructed and arranged i) to be in a latching position when said latching mechanism is in latched relation with the door opening catch, and ii) to be moved from said latching position into a releasing position in response to movement of said movable releasing component from said first position to said second position so that the latching mechanism is moved into said unlatched relation with the door opening catch;

a manually operable releasing assembly mounted on said door frame for resiliently biased movement into an inoperative position, said releasing assembly having a manually engageable component disposed outwardly of said interior panel, said manually engageable component adapted to be manually engaged and pivotally moved to move the releasing assembly against the resilient bias thereof from the inoperative position thereof into an operative position, said releasing assembly being constructed and arranged so that upon manual release of the manually engageable component the resilient bias of said releasing assembly returns the releasing assembly into the inoperative position thereof;

a flexible cable having one end connected with said manually operable releasing assembly and a spaced portion connected with said movable releasing component so that (1) the movement of said manually operable releasing assembly from its inoperative position into its operative position is transmitted through tension in the flexible cable into movement of the releasing component from its first position to its second position so that said latch is moved from its latching position into its releasing position, and (2) the movement of said manually operable releasing assembly from its operative position to its inoperative position is transmitted through compression in the flexible cable into movement of the releasing component from its second position to its first position;

a cable-controlling assembly operatively associated with an end portion of the flexible cable generally at said one end;

said cable-controlling assembly including a rigid elongated member fixed to said cable generally at said one end and having a length at least as great as the extent of movement of said one end when said manually operable releasing assembly is moved between said inoperative and operative positions;

said cable-controlling assembly further including a tubular cable bushing disposed in surrounding relation to said cable generally at said one end, said tubular cable bushing having an interior surface defining a passage through said bushing and forming one opening at one end of said bushing and an opposite opening at an opposite end of said bushing, said one opening in said bushing being constructed and arranged to receive a portion of said rigid member in a coaxially extending relation therewith when said releasing assembly is in said inoperative position and to receive a relatively shorter portion of said rigid member in non-coaxially extending relation therewith when said releasing member is in said operative position, and wherein a diameter of said passage increases as it approaches said one opening at said one end of said bushing to permit said rigid member to be moved out of said coaxial relation with respect to said cable bushing when said rigid member is moved by said pivotal movement of said manually engageable component to move the releasing assembly from inoperative position to the operative position;

said cable-controlling assembly being constructed and arranged in surrounding relation to said cable end portion to prevent buckling of said flexible cable portion under compression during the resiliently biased return of said releasing assembly.

2. The vehicle door latch assembly according to claim 1 wherein a tubular sheath protectively surrounds a major portion of said cable.

3. A vehicle door latch assembly according to claim 1 wherein said opposite opening at said opposite end of said bushing is constructed and arranged to receive one end of said tubular sheath in fixed relation thereto.

4. A vehicle door latch assembly according to claim 1 wherein said cable bushing is fixed to said manually operable releasing assembly.

5. A vehicle door latch assembly according to claim 1 wherein said manually engageable component is pivotable about an axis and connected with said rigid member at a portion thereof spaced from said axis so that pivoting movement of said engageable component enables movement of said rigid member between said coaxial relation with said tubular cable bushing and said non-coaxial relation with said tubular cable bushing.

6. A vehicle door latch assembly according to claim 1 wherein said movable releasing component is resiliently biased into its first position and moved against the resilient bias thereof into its second position in response to movement of the manually operable releasing assembly from its inoperative position to its operative position through tension in the flexible cable.

7. A vehicle door latch assembly according to claim 6 wherein said movable releasing component returns to said first position from said second position through the resilient bias thereof and compression in said cable when said manually operable releasing assembly is moved from its operative position to its inoperative position.

8. A vehicle door latch assembly according to claim 1 wherein said manually operable releasing assembly mounted comprises a spring member for effectuating said resiliently biased movement thereof into said inoperative position, said manually engageable component being cooperable with said spring member so that said spring member is stressed upon manual engagement and movement of said manually engageable component to move the releasing assembly from the inoperative position thereof into the operative position thereof, said releasing assembly being constructed and arranged so that upon manual release of the manually engageable component the spring member returns the releasing assembly into the inoperative position thereof.

* * * * *